March 31, 1970 J. W. RICH 3,503,600
LIQUID SHOCK ABSORBING BUFFER
Filed Aug. 30, 1967 4 Sheets-Sheet 1
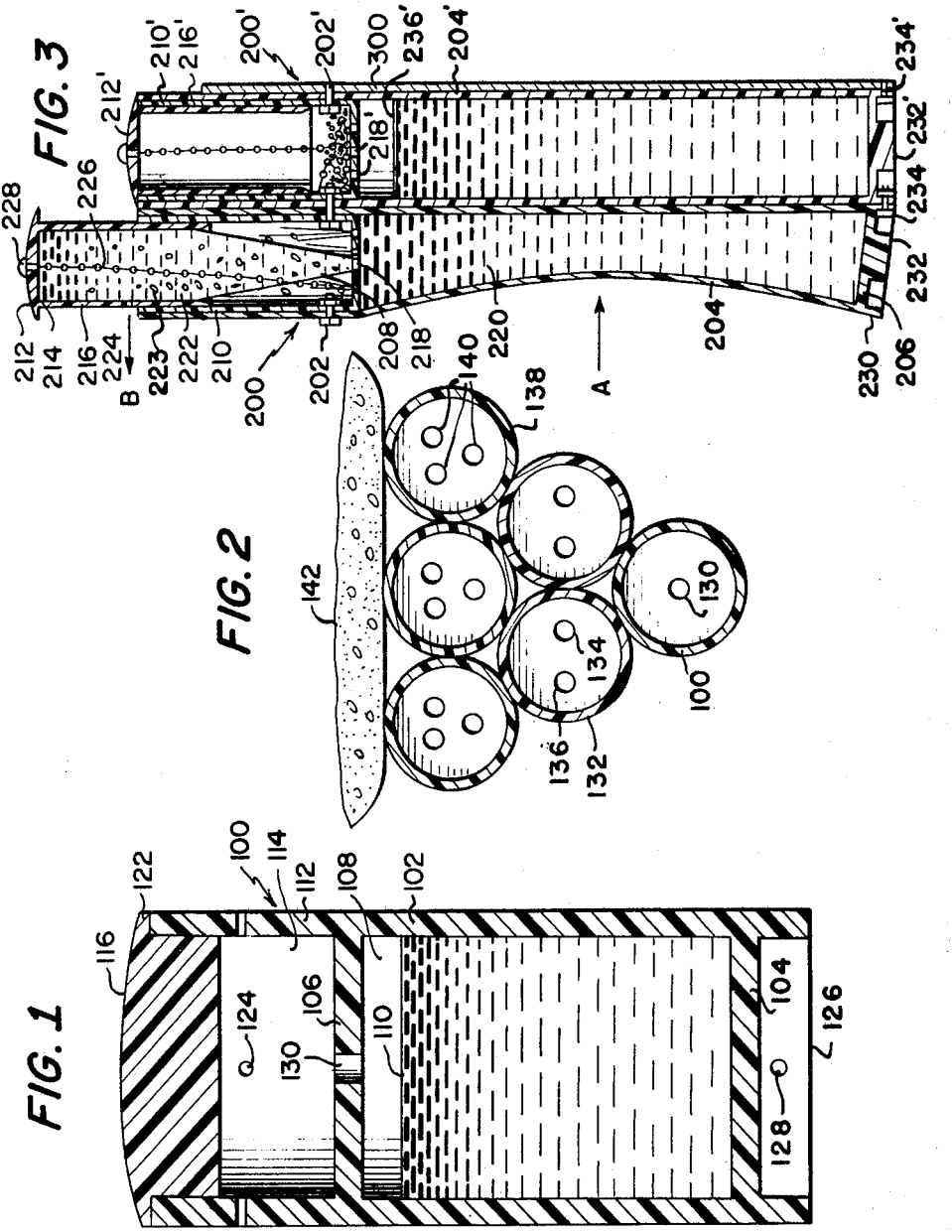
INVENTOR
JOHN W. RICH
BY Kimmel, Crowell & Weaver
ATTORNEYS

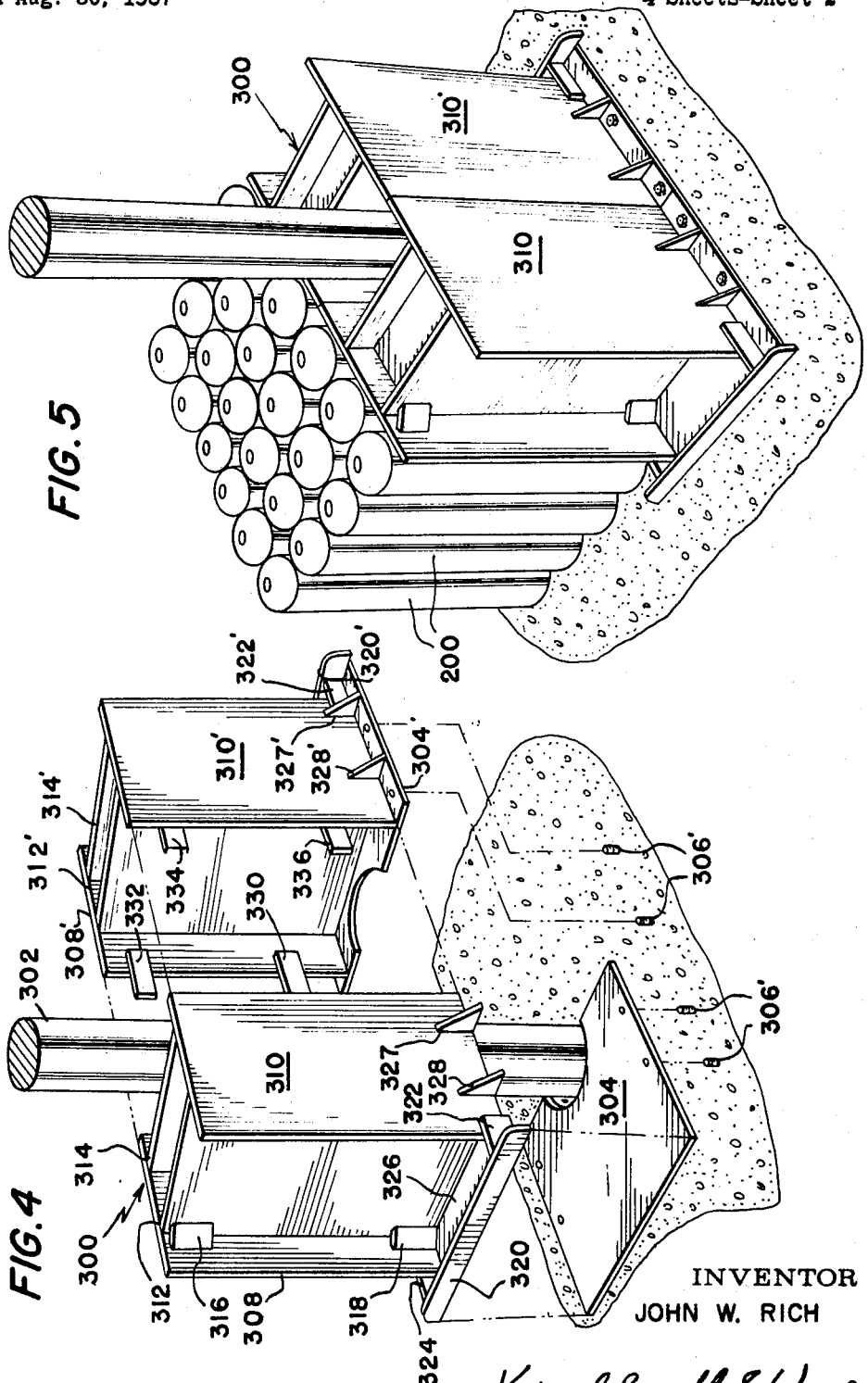

March 31, 1970      J. W. RICH      3,503,600
LIQUID SHOCK ABSORBING BUFFER
Filed Aug. 30, 1967      4 Sheets-Sheet 3
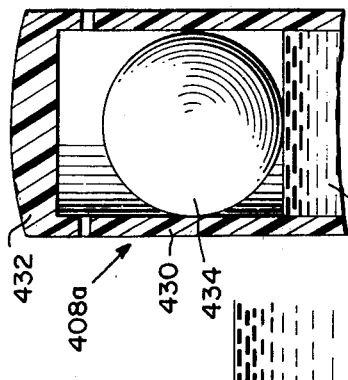
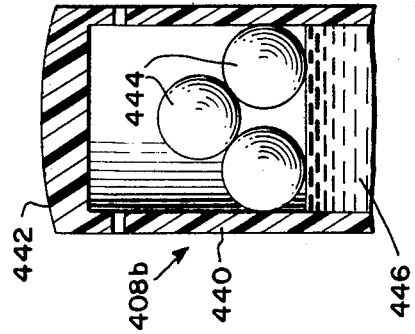
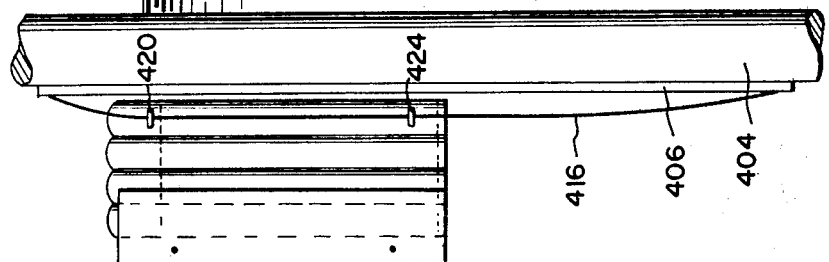
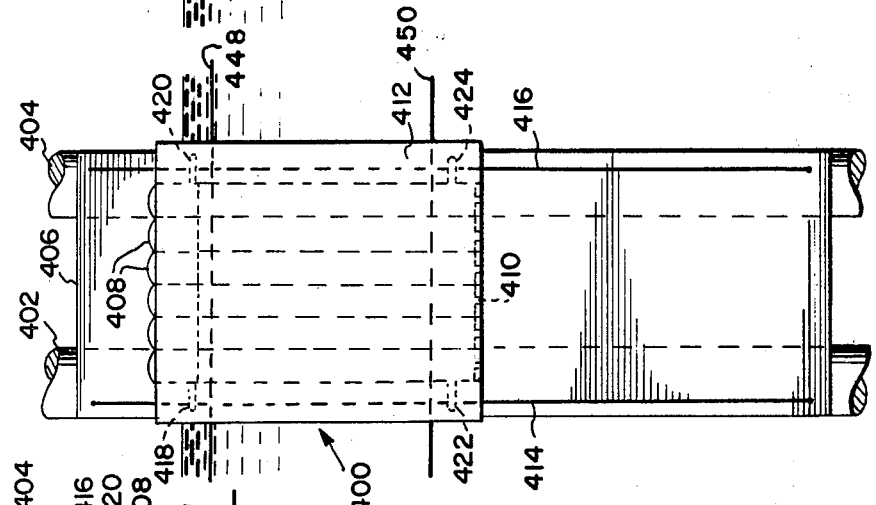
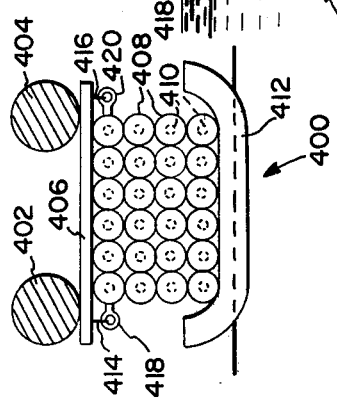
INVENTOR
JOHN W. RICH
BY Kimmel, Crowell & Weaver
ATTORNEYS

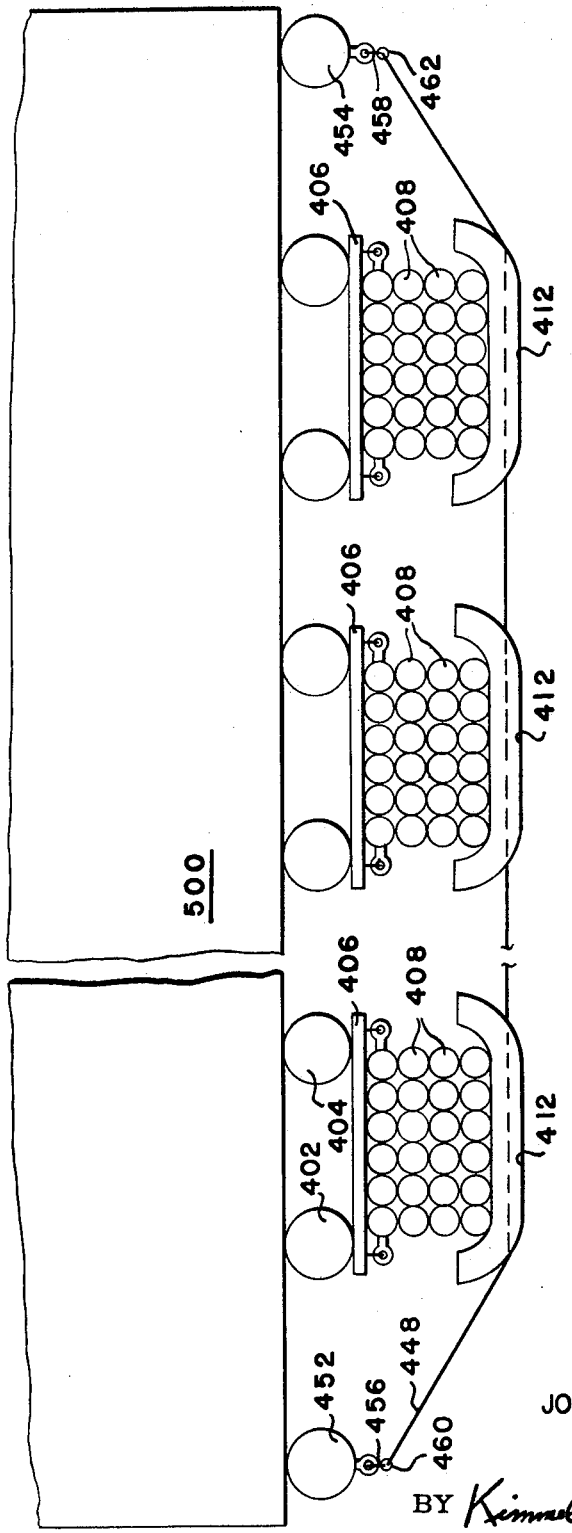

United States Patent Office 3,503,600
Patented Mar. 31, 1970

3,503,600
LIQUID SHOCK ABSORBING BUFFER
John W. Rich, 3224 Churchill Road,
Sacramento, Calif. 95825
Filed Aug. 30, 1967, Ser. No. 664,333
Int. Cl. F16f 5/00, 9/08
U.S. Cl. 267—1                                  20 Claims

ABSTRACT OF THE DISCLOSURE

An impact absorbing resiliently deformable body having a chamber, an additional chamber which may have plastic chips therein, a plurality of passageways communicating between the chambers, liquid in the first chamber which may be covered with a nonevaporative liquid, and the composite buffers made up of a plurality of such bodies, for transferring the kinetic energy of a moving body to the liquid in such chambers is disclosed.

BACKGROUND OF THE INVENTION

Field of the invention

This invention relates to stationary safety devices and more particularly to kinetic energy absorbing safety buffers for reducing or preventing injury to persons and property upon collision of a boat, automobile or other vehicle with such fixed objects.

Description of the prior art

Devices of this general character are known in the prior art for absorbing the kinetic energy of impact of colliding automobiles and vehicles, and bumpers for boats are known; however, such devices as are known in the prior art suffer from two disadvantages, generally. First, many of the devices require attention and maintenance and, therefore, have not been successful in use at remote locations where it is impractical or economically infeasible to provide the required maintenance and attention. Secondly, many devices which would otherwise perform the function of the present invention become useless after a single impact and must be replaced. Again, accessibility and economic feasibility has limited or prevented the application of such devices. The present invention overcomes these and other difficulties and insufficiences of the devices of the prior art; accordingly, it is an object of this invention to provide an improved fixed buffer.

SUMMARY

The present invention is directed to a resiliently deformable body having a chamber therein which is filled with a liquid or fluent material which may be covered with a nonevaporative liquid and having a plurality of passageways to permit such liquid to be forced from the chamber upon impact of a vehicle with the body. An additional chamber communicating with the first chamber by the passageways which may be partially filled with a multiplicity of plastic chips and be provided with a removable cover is also disclosed. Normally the body is a cylindrical body and in a preferred embodiment the additional chamber is cylindrical in shape and may include a slidable piston-like cap in the opening thereto. The first chamber may include, in an embodiment adapted for use in boats, one or more air filled resilient balls. A plurality of such bodies are combined to form a buffer construction. A back-up member for such buffer construction is also disclosed. Accordingly, the objects of the invention include the following:

The provision of an improved resiliently deformable liquid filled buffer member.

The provision of a buffer construction comprising a plurality of such buffer members.

The provision of a buffer construction comprising a plurality of such buffer members and a back-up member.

The provision of a buffer which comprises a resilient body having a chamber therein which is normally filled with a fluent material and includes a passageway for such fluent material.

A buffer member which comprises a resiliently deformable body which includes two chambers communicating by a passageway, one of said chambers having an opening therein which is normally closed by a removable cap.

The provision of a buffer member which comprises a resiliently deformable body having a cylindrical chamber which has an opening thereto and a cap which has extended flanges for being normally disposed adjacent the walls of the cylindrical chamber to form a piston-like cap for being reciprocably partially expelled through said opening by liquid or fluent material.

The provision of a cylindrical buffer member made of a resiliently deformable material which includes a chamber, a passageway in the bottom of the body communicating with the chamber for permitting escape of liquid in the chamber, said body being constructed and adapted to include a buoyant material in the upper portion thereof for floating in a body of water.

The provision of a normally cylindrical resiliently deformable body which includes a liquid in a chamber in such body, a passageway to permit escape of the liquid from the bottom of the body and at least one and preferably a plurality of resilient gas filled balls in the chamber to provide buoyancy for the body.

The provision of a back-up member for a safety buffer construction of improved design.

The provision of a protective layer of nonevaporative liquid over liquid in a bottom chamber to prevent the evaporation of such liquid.

The provision of energy dissipating means including a plurality of passageways and multiplicity of plastic chips for disbursing the flow of liquid from one chamber to another in a safety buffer body.

BRIEF DESCRIPTION OF THE DRAWING

FIGURE 1 is a side elevational view in cross section of a first embodiment of this invention.

FIGURE 2 is a top cross-sectional view of a plurality of safety buffers of this invention forming a buffer construction.

FIGURE 3 is an alternative and preferred embodiment of a buffer member of this invention shown in side elevational view and in cross section as it would appear under impact and a similar buffer member as it would normally appear.

FIGURE 4 is an exploded view of a buffer construction back-up member.

FIGURE 5 is a perspective view of a buffer construction including the buffer construction back-up member of FIGURE 4.

FIGURE 6 is a top view of a buffer construction adapted and constructed for use on piers, docks and pilings.

FIGURE 7 is a front elevational view of the buffer construction of FIGURE 6.

FIGURE 8 is a side elevational view of the buffer construction of FIGURE 6.

FIGURE 9 and FIGURE 10 disclose alternative embodiments showing a detail of a portion of the buffer members of FIGURE 6.

FIGURE 11 is a construction involving a plurality of individual buffer constructions secured together for use along a pier or wharf.

THEORY OF OPERATION

Before describing the various specific embodiments and specific constructional features which have been found useful and effective in practice, it is deemed desirable to set forth the basic concept and theory of operation of the devices of this invention. Basically, the concept involved here is that if a properly constructed container for a liquid or fluent material is provided and the container has passageways of restricted size disposed properly relative to a liquid in the container or chamber then the kinetic energy of a moving body such as a boat in one case or a vehicle in another case is dissipated by being transferred to the liquid as the liquid is expelled at a rate commensurate with the impact energy of the moving body through a comparatively small passageway against the force of gravity. Thus, there are a number of physical forces at work. First, there is the viscosity of the liquid or fluent material involved. Generally speaking, a liquid such as water, which is substantially a Newtonian liquid is utilized. A substantial fraction of the kinetic energy of the moving body, upon impact with the buffer described herein, is absorbed by the energy required to overcome the reacting force of viscous flow and expel the liquid through a comparatively small passageway. The force necessary to cause turbulent and viscous flow through one or more small passageways is a major physical factor in dissipating the energy of impact.

Of significantly lesser importance is the force absorbed by the conversion of the kinetic energy of the moving body, such as a vehicle, to the liquid in the form of kinetic energy and, ultimately, in the form of potential energy by forcing the liquid against the force of gravity. Thus, in one case, the liquid is forced through a narrow passageway from a lower chamber into an upper chamber, against the force of gravity. In another embodiment, the liquid is forced through a narrow passageway in the bottom of the chamber into a body of water. In this case, the force of gravity is overcome as the gravitational effect on the body of water forces the liquid from the body of water upwardly through the passageway into the container or chamber. Thus, gravitational force is a significant factor even in this embodiment where the liquid is expelled out of the bottom of the chamber.

While conventionally, for economic and practical reasons, a generally Newtonian liquid such as water or water which has an antifreeze component are used in this invention it will be understod that there may actually be significant advantages to the use of non-Newtonian fluids. For example, a thixotropic material such as a gel which is normally a semisolid material when at rest but when agitated, vibrated or subjected to the action of vibratory or other forces becomes a liquid may have very decided advantages. Because of the variable resistance to flow which is a function of the force exerted on the liquid body, such materials may be formed by the addition of small quantities of an electrolyte to concentrated sols of metallic oxides, such as ferric oxide, aluminum trioxide and certain other sols such as bentonite clays. Certain gelatin preparations and polymer dispersions also exhibit this characteristic.

Conversely, it may be advantageous to use a dilatant material, such as various colloid solutions, the nature of which are well recognized, in which there is increasing resistance to flow as the force of impact increases.

While the exact arrangement which gives optimum results has not been determined, a buffer construction which includes a number of buffer members, some of which are filled with a Newtonian liquid, some of which are filled wits a thixotropic liquid, and some of which are filled with a dilatant liquid will give very pronounced advantages. In addition, certain combinations of only two such liquids, such as a Newtonian and a thixotropic liquid or a dilatant and a thixotropic liquid, or a Newtonian and a thioxotropic liquid, result in very pronounced and distinctive advantages, Since liquids of any desired viscosity and of any desired flow characteristic may be used, it will be understood, that, hereinafter, where reference is made to liquid the term will be construed to include any fluent material whether it be of the conventional liquid such as water, a sol, a dispersion, a colloidal suspension, or simply solid particles of a fluent nature.

A significant operational factor in the absorption of the kinetic energy of the vehicle or boat is the inertia in the liquid which must be displaced. As the moving body strikes the buffer, the kinetic energy of the body is absorbed or dissipated by overcoming the inertia of the liquid which is normally at rest. In this regard, it may be desirable to provide very high density liquids such as water solutions of high density metallic salts to provide for maximum inertia. It will be apparent that by careful selection of solutes desirable density characteristics as well as viscous or flow characteristics may be obtained.

Yet another factor in the absorption of the kinetic energy of the moving body is the inertia of the buffer construction itself and the force required to deform the buffer construction. It is important to note that it is not desirable to merely store up the kinetic energy of the vehicle, as would occur with a spring, since this would tend to give a second direction of movement of the vehicle or body once the initial kinetic energy of the body has been dissipated. Thus, if a spring is utilized as a buffer member there is the initial impact with a resulting effect upon the occupants of the vehicle and then there is a second impact when the spring forces are released. Thus, it is important that the buffer member be constructed of a material which, while resilient, is comparatively easily deformable and tends to return to its normal configuration.

By careful selection of materials and constructions it is possible to provide buffers and buffer constructions which will absorb the kinetic energy of bodies which are moving at various speeds. It is necessary that the body be made of a material which is sufficiently strong and resilient to resist the impact of a collision at a variety of temperatures. It is important that the material retain its flexibility and strength at low temperatures as well as high temperatures since the buffers may be used in areas where there is a great variance in the summer and winter temperatures. It is essential that the amount of liquid and the apertures provided for dissipation of the energy of impact be adapted to dissipate the energy by transferring the energy of impact to the hydraulic liquid. Much of the energy is dissipated in the viscous flow and dispersion of the liquid in moving from one chamber to another.

The buffer members which will be described hereinafter in greater detail have been tested extensively with conventional automobiles travelling at speeds of from 25 to 30 miles per hour. Using the buffer members and the buffer constructions of this invention, it is possible to drive a vehicle into a concrete abutment which is protected by a buffer construction as described without injury to the vehicle or to the occupants thereof. Instead of stopping instantaneously as the vehicle strikes the abutment, the vehicle slows to a stop over a finite distance. Ideally, the vehicle would decrease at a linear rate. That is, the change in velocity per unit time, $dv/dt$ is substantially constant from the time the vehicle first contacts the buffer construction to the time it comes to a stop. If this ideal can be attained, the maximum safe deceleration for the occupants of the vehicle can be ascertained and the buffer may be constructed to maintain the rate of deceleration, minus $dv/dt$, within safe limits. In practice, the buffer constructions of the prior art have not achieved this and it appears that very little consideration has been given to this highly important and critical feature in buffer construction. By proper selection of buffer bodies which include the proper number and size of apertures and volumes of liquids, it has been possible to very closely approach the ideal; that is, a linear rate of deceleration. The rate of deceleration may also be controlled by the proper selection of liquid materials.

With respect to materials of construction, the buffer members of this invention may be of a large variety of resilient materials which are also deformable. However, certain plastic materials rather than rubber, have been found the most advantageous for several reasons. First, these materials, such as polyvinyl chloride, copolymers of vinyl chloride, and heavily plasticized polymers and copolymers of vinyl chloride and vinyl acetate and certain synthetic rubbers, tend to absorb a substantial fraction of the kinetic energy of the vehicle without rebounding in such a manner as to provide an additional impact as the vehicle comes to a stop. These materials return to their original shape but more slowly than most rubber or rubber-like materials. In addition, these materials are highly resistant both to chemical attack from a liquid inside and from the elements outside and are rugged enough for practical utility. That is, they may be utilized over and over again without repair or attention since they return to their original configuration following an impact. In addition, these materials may be heavily pigmented to increase the inertia of the container body proper and to provide any desired color or characteristic. For example, such containers may be pigmented with fluorescent pigments which show up brilliantly in reflected light. This provides an additional warning.

CONSTRUCTIONAL DESCRIPTION

Reference is made first to FIGURE 1 which depicts an early embodiment of the present invention. The buffer 100 includes a body which has a cylindrical wall 102, a bottom 104, a closure 106 which may be formed integrally with the walls 102 and defines a chamber 108 which is preferably filled with a liquid 110 as described. An additional cylindrical wall 112 defines a chamber 114 above the chamber 108 in cooperation with a closure 116 in an opening in the upper chamber 114. The closure 116 rests in the top portion of the chamber 114 and may be easily removed. A flange 122 is formed on the closure 116 to maintain it in position. A plurality of apertures 124 provided for securing the buffer member to adjacent buffer members and to the back-up member as will be described. The buffer member is supported by a wall extension 126 which may include a plurality of apertures 128. Aperture 128 serves a function analogous to that function performed by aperture 124. A passageway 130 provides communication between the chamber 108 and the chamber 114. A plurality of passageways or even a multiplicity of very small passageways may be provided; however, a single passageway is shown as exemplary.

Thus, when a moving body such as a vehicle strikes the buffer member 100, which is a cylindrical body construction so that in normal practice the vehicle will impact the buffer member adjacent the lower chamber 108, the liquid 110 is forced against the force of gravity through the passageway 130 into the upper chamber 114. As the liquid flows into the chamber 114 the air is expelled therefrom and the closure 116 may be expelled from the container if the vehicle contacts the buffer member with sufficient impact. The energy of impact is absorbed in the physical displacement of the water but more importantly in the viscous flow of the water through the aperture 130 or a multiplicity of apertures as may be desired. Of course, a vehicle travelling at a low velocity would displace only some of the liquid from chamber 110 and would not expel the top or closure member 116 from the chamber 114.

In addition to the possibility of varying the absorption conditions by varying the construction and materials of the buffer members, the liquids, and the physical parameters, it has been found that absorption characteristics can be varied by the selection of the number of passageways and the size of the passageways which communicate between the chamber 108 and the chamber 114. For example, with reference to FIGURE 2, it has been found that a single buffer body 100 having an aperture 130 therein may be backed-up by a plurality of buffer bodies 132 which may have two aperture 134 and 136 which in turn may be backed-up by three or more buffer bodies 138 which may include a multiplicity of apertures therein shown at 140. The buffer bodies may be arranged in a triangular configuration against a concrete abutment 142. Of course the use of a triangular configuration is merely exemplary of the type of buffer construction which may be used. Rectangular, arcuate, or any other desired configuration may be used depending upon the desired results.

By selection and experimentation using the proper construction, the optimum arrangement of buffer members may be provided. In addition to the construction shown in FIGURE 2, a pole may be protected, depending upon its size, simply by securing three or four or more buffer members to the pole so that all sides are protected by such a buffer member. This is especially useful for lighting poles in parking lots and for lighting and utility poles along heavily travelled highways. Larger poles will require four or more buffers depending upon the size of the pole while a small pole will require only three in order to completely surround the pole. Since, from the foregoing description, this construction is apparent, it is not deemed necessary to illustrate it.

An improved embodiment of the invention is shown in FIGURE 3. FIGURE 3 shows two identical buffer members 200 and 200'. Only one of the buffer members will be described in detail but it will be understood that, except as noted, the construction of the other is identical.

Buffer member 200 is shown as it would be during deformation, that is as a vehicle was impacting the buffer member, while buffer member 200' is shown in its normal state as it would appear at rest.

A plurality of bolts 202 are provided for securing the buffer members together to a back-up member, such as a back-up member 300 which will be described in detail hereinafter.

The buffer member 200 includes a cylindrical body 204 which has a bottom 206 and a partition 208 which, preferably, is formed as the bottom of an additional cylindrical member 210 which is slipped down into the top of the cylindrical walls 204. Of course the bottom 208 may be formed integrally with the cylindrical member 204 in the manner shown in FIGURE 1. A closure member 212 in the form of a cap which has a flange 214 thereon is provided for the top of the upper chamber formed by the cylindrical member 210. A flange extension 216, which is shown to be integral with flange 214, as in the desired embodiment, may be provided but it is not necessary to the operation of the buffer member.

A plurality of apertures 218, preferably, are provided in the partition member 208. Upon impact, the liquid 220 which is received in the lower chamber, formed as described, is forced through the passageways 218 into the upper chamber as shown at 222. The jets 222 impact the closure 212 and, upon sufficient impact, force it from the upper chamber. A plurality of plastic chips 223 are preferably confined in the upper chamber. These plastic chips along with a plurality or multiplicity of passageways 218 disburse the liquid and increase the turbulent flow characteristics thereof to increase the energy absorption of the liquid as it passes through from the lower to the upper chamber.

In a preferred embodiment, in which the closure includes a flange 216, the flange extension is provided with one or more apertures shown at 224 to permit escape of air from the upper chamber as the closure moves upwardly.

In the preferred construction, it is desirable, to prevent vandalism and loss, by providing a chain 226 which is secured by a bolt or other securement 228 to the closure 212 and to the bolt 208. The chain provides means for preventing separation of the cap from the buffer body.

Support extensions or flanges 230 and a central support boss 232 are provided on the bodies and a plurality of buffer members may be secured together by bolts 234 or the buffer member may be secured to a back-up member 300 by a bolt 234'.

In the preferred embodiment, the flange on the cap is in the form of a cylindrical extension which rests adjacent the cylindrical interior walls of the upper chamber in the form of a piston. As the jet of water is expelled through the passageway 218, the closure member is reciprocably forced in a piston-like manner through the opening in the upper chamber. Any entrapped air and the liquid is permitted to flow outwardly through aperture 224.

Water is the most convenient and one of the more desirable liquids for use in the buffer member, though not the only one which may be used. Water has the disadvantage that is evaporates at a rather appreciable rate and, thus some degree of maintenance is necessary to replace the water after it evaporates. This problem has been largely eliminated by the provision of a layer of high molecular weight oil 236' shown in the body 200'. This layer of oil 236 covers the liquid and substantially prevents evaporation of the water therefrom.

THE BACK-UP UNIT

As shown in FIGURES 4 and 5, the buffer members 200, as shown in FIGURE 3, are preferably used in conjunction with a back-up barrier which is made up of two units which fit on the sides of a post or other object to be protected.

The back-up unit 300 is adapted to fit around a post 302. Of course, the size and shape may be adapted according to the nature of the object to be protected.

The back-up member 300 comprises two units which, except as noted, are mirror images of each other. A base plate 304 is provided with a cutout for the object 302 to be protected and with a plurality of apertures for receiving bolts 306 which are formed in a concrete or macadam roadway or otherwise secured to the ground.

A plate 308, in conjunction with the plate 308' forms a generally planar back-up surface on one side of the post while a plate 310, in conjunction with a plate 310', forms a similar planar back-up surface on the other side of the post 302. The plates 308 and 310 are secured together by spacer plates 312 and 314 which, in turn, are braced about corner braces 316 and 318 according to good constructional practice. A base bar 320 secured by plates 322 and a reinforcing plate 326 are secured at the bottom of the back-up plates 308 and 310.

Triangular reinforcing members 327 and 328 further secure the back-up plates 310 to the base plate 304. In order to maintain the back-up plates 308 and 310 in alignment with back-up plates 308' and 310' a plurality of engaging lugs 330, and a similar lug on the other side, 332, and a similar lug below and 334 and 336 are provided as shown in FIGURE 4. Two central lugs 330 on back-up plates 308 and 310 and upper and lower lugs on back-up plate 310' are provided preferentially.

As shown in FIGURE 5, a plurality or multiplicity of buffer members 200, or if desired buffer members 100, may be secured on one side of the back-up plate 308. This arrangement protects the post 302 from injury and, more importantly, prevents injury to a vehicle and passengers in a vehicle should such vehicle strike the buffer construction.

As previously explained, the buffer construction shown in FIGURE 5 may include a buffer member having passageways of different sizes and different numbers of such passageways, may be constructed of different materials and include varying liquid materials. By such arrangement any desired buffer characteristics may be obtained.

DOCK BUFFER CONSTRUCTION

FIGURES 6 through 11 describe a dock buffer construction utilizing the inventive concept as previously disclosed but slightly different in arrangement.

The buffer construction 400 may conventionally be used with one or more pilings 402 and 404 and comprises a back-up plate 406 and a plurality of buffer members 408 which are generally of the type described except that they include openings 410 in the bottom thereof and closed at the top. This construction will be described in greater detail hereinafter. A front buffer or rubbing plate 412 which has, preferably, a generally flat face surface and is curved at the ends and may be made of marine plywood or a like metal alloy such as aluminum or magnesium is provided as part of the buffer construction. A plurality of buffer members 408 are secured together in the arrangement shown in FIGURE 6 or in any desired arrangement according to the shape and nature of the dock, pier, piling or other object around which the buffers are to be arranged. A pair of vertically oriented cables 414 and 416 shown best in FIGURES 7 and 8, which are slidably received in eyes 418, 420, 422 and 424 provide for vertical movement of the buffer arrangement with the tides. As shown in FIGURES 7 and 8, the ends of the cables, or ropes of the equivalent 414 and 416 are secured at their ends to the upper and lower portions of the backing member 406. Thus, the buffer construction is permitted to ride up and down with the tide or with large waves.

In the preferred embodiment, the buffer member comprises an elongated cylindrical member which is closed at the top and the bottom which has a restricted passageway or a plurality of passageways therethrough. The walls 430 may be formed integrally with a top or cap portion 432 and, similarly, the walls and the cap 440 and 442 respectively may be formed integrally. In FIGURE 9, one or more resilient balls filled with a gas such as air which is less dense than water may be provided in the chamber formed by the side walls 430. Liquid 436 is provided from the body of water. In the embodiment of FIGURE 10, a multiplicity of smaller balls 444 which are less dense than water or the liquid 446 are provided, and as before, the chamber may be substantially filled with smaller balls 444.

FIGURE 11 shows a buffer construction for use on wharfs or along docks, where heavy vessels approach at an angle. In this embodiment, a plurality of buffer constructions of the type previously described are secured together by a pair of elongate cables or ropes 448 and 450 also shown in FIGURE 7. The cables are secured to pilings 452 and 454 and may be secured, if desired, to ride up and down vertically in the same manner that the buffer members ride up, that is by providing a pair of vertically disposed cables 456 and 458 about which rings 460 and 462 are slidably received. Actually, this is not necessary in most cases since sufficient vertical movement would be allowed by a stationary securement of the ends of the cables 448 and 450.

This provision of a multiplicity of buffer constructions each having a rubbing face which is secured to the other rubbing faces and to the pier by a pair of cables prevents dislodgement of the buffer constructions by a vessel which approaches the dock while moving forwardly and inwardly toward the dock.

IN GENERAL

It will be understood that, as shown, it is preferred that the bodies which form the buffer members be constructed substantially as a unitary body but that such construction is not necessary to the operation of the invention. What is required is that the desired wall portions be made of the required materials and that the contents be equivalent to those described. For example, in FIGURES 9 and 10, the closure caps 432 and 442 may be removably received rather than being formed unitarily with the walls.

The multiple cell energy absorbing continuation buffer constructions consist of a group of bodies or cells which are bolted together in appropriate configurations and attached to fixed objects. The cell units absorb the energy of impact when the fixed objects are struck by moving vehicles. The cells act together with each cell adding to the total energy absorbing capacity of the units. By proper placement, a substantially linear deceleration may be achieved thus achieving a result which is more than the sum of the component parts.

The factors which must be considered in designing the cell units include (1) the weight of the impacting vehicle, (2) the velocity of the vehicle, (3) the upper limit of allowable deceleration forces on the object during impact, (4) the upper limit of allowable deceleration forces on the occupants of the vehicle during impact, (5) the yielding characteristics of the fixed object being protected. With respect to the last consideration, for most cases it is assumed that the fixed object is nonyielding.

When the above factors are known, the depth from front to back of the multiple cell units is calculated using the deceleration distance required for limiting the deceleration force load.

The size of the orifice is complicated in that the orifice capacity of the cells is varied, normally increased, from front to back of the unit. The front cells are in action, under pressure for a longer period of time than the ones at the back of the unit. Therefore, the orifice capacity of the front cells must be less than the ones at the back of the unit in order to prevent total discharge of the liquid in the front cells before the vehicle has appreciably affected the liquid in the back cells. This provides a more efficient and substantially linear deceleration curve for the impacting vehicle.

The overall orifice capacity of the units is governed by the weight and the velocity of the impacting vehicle. For example, a cell unit will require a greater orifice capacity for a light vehicle than it will for a heavy vehicle of the same initial velocity and deceleration load.

Because of the complexity of the problem, orifices have been sized by empirical methods. For example, a unit was successfully tested several times at impact velocities between 25 and 30 miles per hour. The cell units consisted of nine rows of cells with five cells per row. Each cell was 6 inches in diameter. The weight of the test vehicle was 3500 pounds. The following table gives the number and size of the orifices in each row of the cell unit, which resulted in a substantially linear deceleration rate.

| Row | Number of orifices | Orifice size (in.) |
|---|---|---|
| Front: | | |
| 1 | 5 | ¾ |
| 2 | 5 | ¾ |
| 3 | 6 | ¾ |
| 4 | 6 | ¾ |
| 5 | 7 | ¾ |
| 6 | 7 | ¾ |
| 7 | 8 | ¾ |
| 8 | 8 | ¾ |
| Back, 9 | 8 | ¾ |

The vehicle is subjected to approximately 7 $g$'s during the impact test.

A single row of 6 inch diameter cells protecting fixed objects in a parking facility requires approximately 2 one-half inch diameter orifices or 12 one-eighth inch diameter orifices in each cell. This orifice capacity will protect the average size vehicle (3500 to 4000 pounds) travelling at less than 5 miles per hour from significant damage. Cell units varying between 1 and 9 rows have also been successfully tested with varying orifice capacities. To date, only empirical data are available for the design of buffer units but it is anticipated that upon collection of adequate data a more basic and sound approch will be available for the design of such units.

It will be understood that is, with respect to this invention, the physical characteristics of the materials which are important and not specifically the materials mentioned herein.

Accordingly, several embodiments have been shown which have been tested and found effective for the various facets of the invention and while the invention has been abstracted, summarized and disclosed with respect to such specific embodiments and construction, it is intended and expected that such disclosure will be considered as merely exemplary and not limiting and that the invention will be limited and defined only according to the claims which now follow.

I claim:

1. A moving body impact absorbing safety buffer for use in association with a fixed object which comprises, in combination:
   a body having a chamber adapted normally to be at least partially filled with a substantially incompressible liquid therein, said body having wall portions and including wall portions which consist of resiliently deformable material having sufficient rigidity to retain a normal shape and to return to said normal shape after deformation and to support a substantially incompressible liquid in said normal shape;
   a substantially incompressible liquid in said chamber;
   said chamber being closed except for at least one passageway disposed to permit flow of said liquid therethrough upon impact, said passageway being of a small size and of a configuration to permit flow therethrough of said incompressible liquid contents when said resilient walls are compressed at a rate commensurate with the severity of the impact and consequent deformation of the walls whereby a substantial fraction of the kinetic energy of a moving body causing deformation is absorbed by the energy required to overcome the reacting force of turbulent and viscous flow of said liquid as it is expelled through said passageway thereby slowing said moving body at approximately a constant rate.

2. The buffer of claim 1 wherein:
   the body has an additional chamber interconnected to said first chamber by said passageway.

3. The buffer of claim 2 wherein:
   the additional chamber has an opening for communication to the exterior of the body; and further comprising:
   a removable closure in said opening, said closure being constructed and disposed to be forced out of said opening by liquid entering the additional chamber from the first chamber.

4. The buffer of claim 3, wherein the closure comprises a cap which comprises:
   a retaining flange constructed and adapted for acting as a piston slidably received in the opening.

5. The buffer of claim 1 further comprising:
   at least one resilient integral hollow body in said chamber.

6. The buffer of claim 5 wherein said hollow body comprises:
   substantially air impervious walls enclosing a material which is less dense than water.

7. The buffer of claim 1 wherein:
   the body is generally cylindrical, is constructed predominantly of said resiliently deformable material, includes an additional chamber normally disposed above said first chamber, said chambers being interconnected by said passageway, and is of a size and proportion for being engaged by a moving vehicle for transferring the kinetic energy of said vehicle to said liquid.

8. The buffer of claim 7 wherein the additional chamber is generally cylindrical and has an opening in alignment with the passageway, and further comprising:
   a cap normally closing said opening for being expelled from said opening by the force of liquid escaping from said first chamber.

9. The buffer of claim 8 further comprising:
a retaining flange on said cap for positioning said cap in said opening.

10. The buffer of claim 9 wherein:
said flange normally extends into said additional chamber adjacent cylindrical walls thereof to form a piston-like cap means for being reciprocably forced through said opening by the force of said escaping liquid.

11. The buffer of claim 10 further comprising:
means for preventing separation of said cap and said body.

12. The buffer of claim 1 wherein:
the body is generally cylindrical, is constructed predominantly of said resiliently deformable material, is of a size and proportion for being engaged by a moving boat for transferring the kinetic energy of said moving boat to said liquid, and wherein said passageway is in a normally bottom wall, said body being constructed and adapted to normally float in a body of water.

13. The buffer of claim 12 further comprising:
at least one gas filled resilient container in said chamber.

14. The buffer of claim 13, further comprising:
a plurality of said resilient containers in said chamber.

15. The safety buffer of claim 1 wherein the diameter of the passageway is of the order of about ¾ inch.

16. A buffer construction for protecting stationary objects adjacent highways and the like from impact by moving bodies, comprising:
a plurality of safety buffers secured adjacent each other for successively and cooperatively absorbing the kinetic energy of vehicle impact, said buffers comprising:
a body having a chamber adapted normally to be at least partially filled with a substantially incompressible liquid therein, said body having wall portions and including wall portions which consist of resiliently deformable material having sufficient rigidity to retain a normal shape and to return to said normal shape after deformation and to support a substantially incompressible liquid in said normal shape;
a substantially incompressible liquid in said chamber;
said chamber being closed except for at least one passageway disposed to permit flow of said liquid therethrough upon impact, said passageway being of a small size and of a configuration to permit flow therethrough of said incompressible liquid contents when said resilient walls are compressed at a rate commensurate with the severity of impact and consequent deformation of the walls whereby a substantial fraction of the kinetic energy of a moving body causing deformation is absorbed by the energy required to overcome the reacting force of turbulent and viscous flow of said liquid as it is expelled through said passageway thereby slowing said moving body at approximately a constant rate.

17. The buffer construction of claim 16 further comprising:
a rigid back-up assembly positioned between said buffers and the object to be protected; and wherein the buffers are so arranged that the buffers near the back-up assembly have a larger total passageway area than those further from the back-up assembly.

18. A buffer construction for absorbing impact energy of moving marine vessels comprising, in combination:
a multiplicity of at least partially water filled buffer members of the type which individually comprise:
an elongate normally vertically disposed floating hollow body having resilient walls of sufficient rigidity to retain a normal shape and at least one passageway disposed proximate the bottom in said body below the normal water level, said passageway being of small size and of a configuration to permit flow of said water therefrom, when said resilient walls are compressed, at a rate commensurate with the severity of impact causing said compression and consequent deformation of said walls whereby a substantial fraction of the kinetic energy of a moving vessel impacting said construction is absorbed by the energy required to overcome the reacting force of turbulent and viscous flow of water from the body as it is expelled through said passageway;
means securing said buffer members into a plurality of individual buffer groups each including a plurality of said buffer members;
a plurality of substantially rigid rubbing plates each secured adjacent a group of buffer members to protect said buffer members from direct impact by a moving vessel and to transmit impact energy from a moving vessel to said group of buffer members; and
at least one flexible elongate member interconnecting said buffer groups and a construction to be protected, for receiving, absorbing and resisting the energy of a moving vessel in the water which approaches the construction nonperpendicularly.

19. The construction of claim 18 wherein the rubbing plates comprises a substantially rigid floatable member having ends normally curving rearwardly toward said buffer group.

20. The construction of claim 19 wherein the plurality of groups of buffer members are secured for vertical movement to accommodate tidal action and wave action but are secured to prevent substantial lateral movement.

References Cited

UNITED STATES PATENTS

| | | | |
|---|---|---|---|
| 1,049,261 | 12/1912 | Pelissier | 114—219 |
| 2,714,011 | 7/1955 | Albee | 280—1 |
| 2,960,055 | 11/1960 | Tomek | 114—219 |
| 3,090,976 | 5/1963 | Liu | 9—8 |
| 3,141,655 | 7/1964 | Platt | 256—1 |
| 3,284,122 | 11/1966 | Rich | 293—1 |

ARTHUR L. LA POINT, Primary Examiner

H. BELTRAN, Assistant Examiner

U.S. Cl. X.R.

9—8; 61—48; 104—254; 114—219; 188—1, 94; 256—1, 13.1; 280—1, 150; 293—1, 64